United States Patent [19]

Tsuyama et al.

[11] Patent Number: 5,328,006
[45] Date of Patent: Jul. 12, 1994

[54] TRACTION CONTROL SYSTEM FOR MOTOR VEHICLE

[75] Inventors: Toshiaki Tsuyama, Higashi-Hiroshima; Toru Onaka, Hiroshima; Kazutoshi Nobumoto, Hiroshima; Makoto Kawamura, Hiroshima, all of Japan

[73] Assignee: Mazda Motor Corporation, Hiroshima, Japan

[21] Appl. No.: 718,962

[22] Filed: Jun. 21, 1991

[30] Foreign Application Priority Data

Jun. 21, 1990 [JP] Japan .................................. 2-163061

[51] Int. Cl.$^5$ ........................................... B60K 41/20
[52] U.S. Cl. ..................................... 477/185; 180/197; 477/186; 477/187
[58] Field of Search ................... 192/1.22, 1.23, 1.24; 180/197

[56] References Cited

U.S. PATENT DOCUMENTS

| | | | |
|---|---|---|---|
| 4,733,760 | 3/1988 | Inagaki et al. | 192/1.22 |
| 4,762,196 | 8/1988 | Harada et al. | 180/197 |
| 5,009,294 | 4/1991 | Ghoneim | 192/1.22 |
| 5,070,461 | 12/1991 | Nobumoto et al. | 180/197 X |
| 5,070,960 | 12/1991 | Nobumoto et al. | 180/197 |

FOREIGN PATENT DOCUMENTS 3625945 2/1987 Fed. Rep. of Germany .
3728574 11/1988 Fed. Rep. of Germany .
3814957 11/1989 Fed. Rep. of Germany .
60-197434 10/1985 Japan .

*Primary Examiner*—Rodney H. Bonck
*Attorney, Agent, or Firm*—Keck, Mahin & Cate

[57] ABSTRACT

A traction control system for a motor vehicle having driving wheels and driven wheels includes a device for detecting the speed of each of the driving wheels of the vehicle, a device for detecting the speed of each of the driven wheels of the vehicle, a device for calculating a slip value of the driving wheels based on the detected speeds of the driving and driven wheels, a traction control device for controlling the driving wheel so that the slip value of each driving wheel is equal to a predetermined desired slip value when the slip value of each driving wheel is greater than the predetermined desired slip value, and a device for estimating a friction coefficient of a road surface which is employed when the predetermined desired slip value is determined. The estimating device calculates, in a first predetermined time period immediately after the traction control is started, an acceleration of the driven wheel based on a speed difference of the driven wheel during a second predetermined time period and an acceleration of the driven wheel based on a speed difference of the driven wheel during a third predetermined time period after the first predetermined time period has passed. The estimating device then estimates the friction coefficient of the road surface by using the calculated acceleration of the driven wheel.

7 Claims, 10 Drawing Sheets

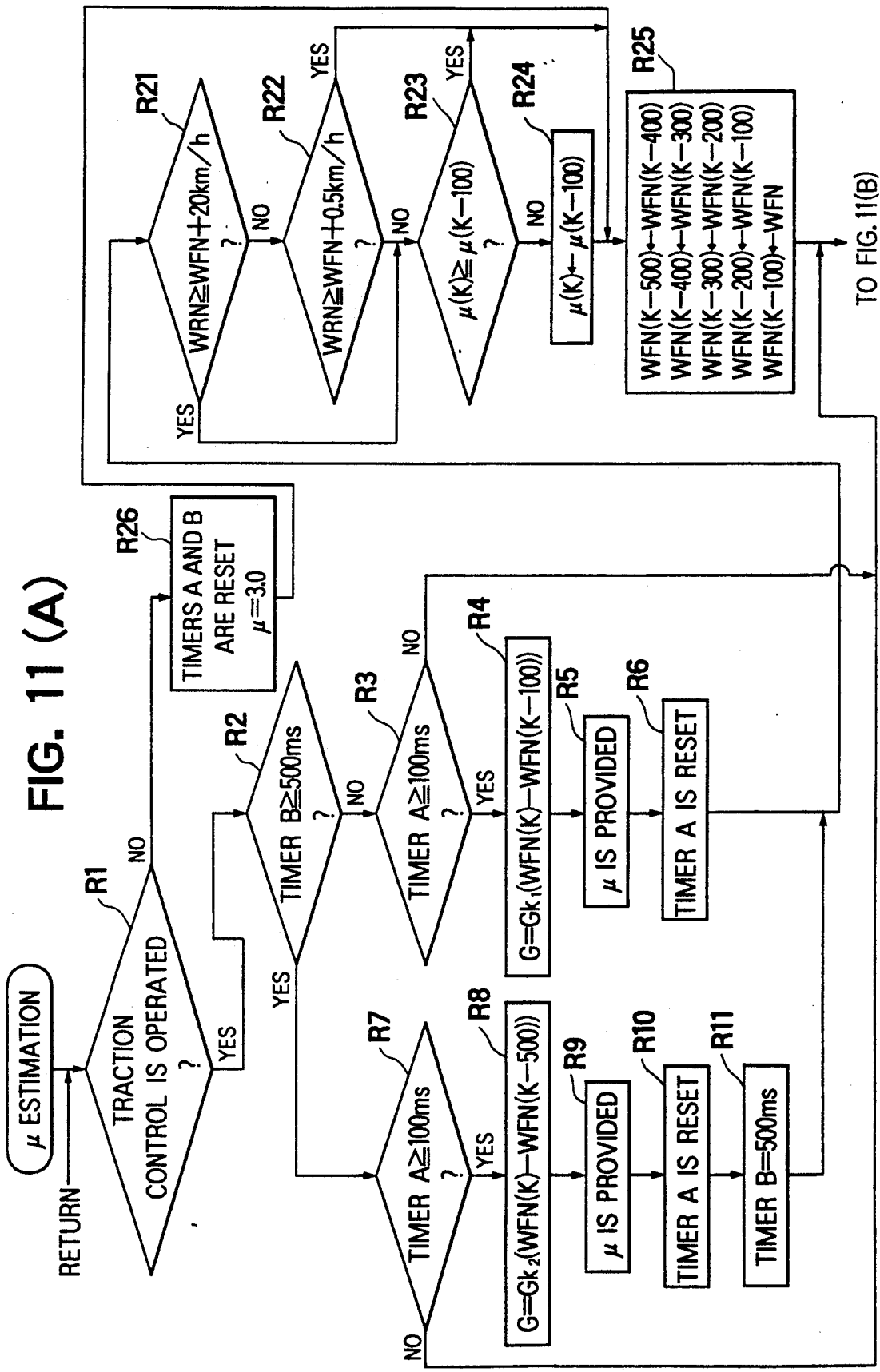

TRACTION CONTROL SYSTEM FOR MOTOR VEHICLE

BACKGROUND OF THE INVENTION

1. Field of the Invention

The present invention relates to a traction control system for a motor vehicle, and in particular to a traction control system in which a slip value of a driving wheel is controlled by employing an estimated friction coefficient of a road surface.

2. Description of Related Art

The traction control system for the motor vehicle detects a slip value of a driving wheel and controls an output of an engine and braking force so that the slip value of the driving wheel is equal to a predetermined desired slip value. The traction control system is used to prevent a decrease of an acceleration of the vehicle caused by the slip which is caused by an excessive driving torque of the driving wheel in an accelerating operation and the like.

The traction control system needs to provide the desired slip value which is determined by a friction coefficient $\mu$ of the road surface, a vehicle speed, an accelerator opening, a steering angle, selection of sports and normal mode, and the like.

The conventional traction control system as shown in Japanese Patent Laid-Open Publication No. 60-197434 estimates the friction coefficient $\mu$ of the road surface based on the acceleration value of the driven wheel when it is determined that a slip is caused. Therefore, in the conventional traction control system, it is difficult to estimate the friction coefficient $\mu$ of the road surface accurately based on the slip condition, the running condition of the vehicle and the like.

SUMMARY OF THE INVENTION

It is therefore an object of the present invention to provide a traction control system for a motor vehicle able to estimate a friction coefficient $\mu$ of the road surface accurately based on the slip condition, the running condition of the vehicle and the like.

It is another object of the invention to provide a traction control system for a motor vehicle able to control a slip of a driving wheel properly at all times.

The above object is achieved according to the present invention by providing a traction control system for a motor vehicle having driving wheels and driven wheels, comprising: means for detecting the speed of each of the driving wheels of the vehicle; means for detecting the speed of each of the driven wheels of the vehicle; means for calculating a slip value of the driving wheels based on the detected speeds of the driving and driven wheels; traction control means for controlling the driving wheel so that the slip value of each driving wheel is equal to a predetermined desired slip value when the slip value of each driving wheel is greater than the predetermined desired slip value. The means for estimating a friction coefficient of a road surface which is employed when the predetermined desired slip value is determined; said estimating means calculates, in a first predetermined time period immediatly after the traction control is started, an acceleration of the driven wheel based on using a speed difference of the driven wheel during a second predetermined time period, calculates an acceleration of the driven wheel based on a speed difference of the driven wheel during a third predetermined time period after the first predetermined time period has passed, and estimates the friction coefficient of the road surface by using the calculated acceleration of the driven wheel.

In a preferred embodiment of the present invention, the traction control means controls the driving wheel by controlling engine output and braking force.

The above and other objects and features of the present invention will be apparent from the following description and by making reference to the accompanying drawings showing preferred embodiments of the present invention.

DESCRIPTION OF THE PREFERRED EMBODIMENTS

The present invention will now be explained with reference to the preferred embodiments and the drawings.

Figure 1:
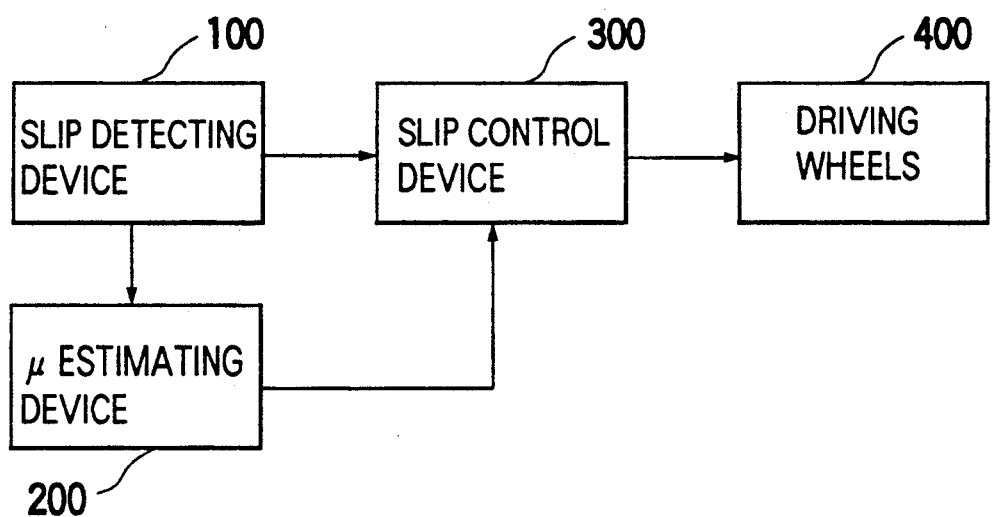
FIG. 1 is a block diagram of a traction control system for a motor vehicle in accordance with an embodiment of the present invention.

FIG. 1 is a block diagram of a traction control system for a motor vehicle in accordance with an embodiment of the present invention. As is seen in FIG. 1, the preferred embodiment of the present invention has a slip detecting device 100 for detecting a slip value of each of the driving wheels 400 of the vehicle, a slip (traction) control device 300 for controlling the driving wheels so that the slip value of each driving wheel is equal to a predetermined desired value when the slip value of each driving wheel is greater than a predetermined value; and a $\mu$ estimation device 200 for estimating a friction coefficient $\mu$ of a road surface which is employed when the predetermined desired value is determined. The $\mu$ estimation device 200 determines an acceleration of the driving wheel by using a speed difference of the driving wheel during a first predetermined time a predetermined time immediately after a traction control is started, determines an acceleration of the driving wheel by using a speed difference of the driving wheel during a second predetermined time after the predetermined time has passed, and estimates the friction coefficient of the road surface by using the acceleration of the driving wheel.

Figure 2:
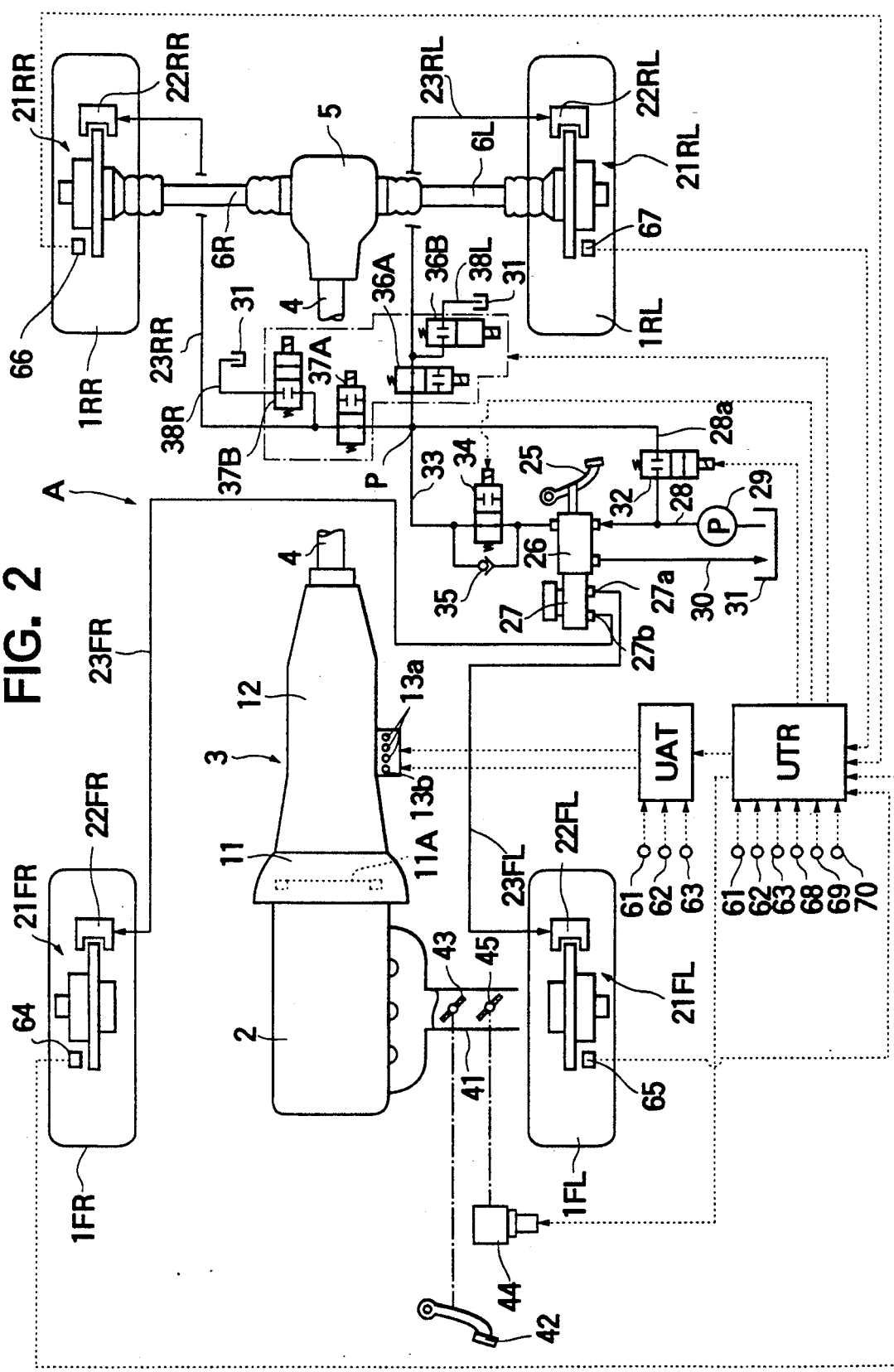
FIG. 2 is a general diagram of a traction control system in accordace with the present invention.

FIG. 2 is a general diagram of a traction control system in accordace with the present invention. Referring to FIG. 2, there is shown a motor vehicle A having a traction control system in accordance with an embodiment of the present invention. The vehicle A has right and left front wheels 1FR, 1FL for driven wheels, and right and left rear wheels 1RR, 1RL for driving wheels.

A driving system includes an engine 2 disposed in the front portion of the vehicle, an automatic transmission 3 connected directly to a crankshaft of the engine 2, a propeller shaft 4 connected to an outputshaft of the automatic transmission 3, a differential 5 connected to the rear end portion of the propeller shaft 4, and driving shafts 6R, 6L extending from the differential 5 in right and left directions respectively and connected to the right rear wheel 1RR and the left rear wheel 1RL respectively.

Construction of the Automatic Transmission

The automatic transmission 3 comprises a torque converter 11 and a multiple-stage transmission gear mechanism 12. The transmission control operation is carried out by selecting combinations of magnetization and/or demagnetization of a plurality of solenoids 13a which are incorporated in a hydraulic control circuit for the automatic transmission 3. The torque converter 11 is provided with a lockup clutch 11A operated by hydraulic pressure. Connection and disconnection of the lockup clutch 11A is carried out by selecting magnetization or demagnetization of a solenoid 13b which is incorporated in the hydraulic control circuit.

The solenoid 13a, 13b are controlled by a control unit UAT for the automatic transmission 3. The control unit UAT stores transmission characteristics and lockup characteristics and in accordance with these characteristics carries out the transmission and lockup controls. In order to carry out these control operations, a main throttle opening signal from a main throttle sensor 61 detecting an opening of a main throttle valve 43, a sub throttle opening signal from a sub throttle sensor 62 detecting an opening of a sub throttle valve 45, and a vehicle speed signal from a vehicle speed sensor 63 detecting a rotation speed of the propeller shaft 4 are input to the control unit UAT.

Construction of the Brake Fluid Pressure Adjustment Mechanism

Brakes 21FR, 21FL, 21RR, and 21RL are provided respectively in wheels 1FR, 1FL, 1RR, and 1RL. Brake fluid pressure is supplied to respective calipers (brake cylinders) 22FR, 22FL, 22RR, and 22RL of the brakes 21FR, 21FL, 21RR, and 21RL through respective brake conduits 23FR, 23FL, 23RR, and 23RL.

Supply of the brake fluid pressure to the respective brakes 21FR, 21FL, 21RR, and 21RL is carried out as follows. First, braking force on a brake pedal 25 is boosted by a hydraulic booster 26 and transmitted to a tandem type master cylinder 27. The fluid pressure transmitted to the master cylinder 27 is transmitted respectively to the front wheel brake 21FR through the brake conduit 23FR connected to a first discharge outlet 27b of the master cylinder 27 and to the front wheel brake 21FL through the brake conduit 23FL connected to a second discharge outlet 27a of the master cylinder 27.

A pump 29 is connected to the booster 26 through a conduit 28. The pump 29 supplies the fluid in a reservoir 31 to the booster 26, and the excessive fluid in the booster 26 is returned back to the reservoir 31 through a conduit 30. A branch conduit 28a with a solenoid switching valve 32 is connected to the conduit 28. A conduit 33 is connected to the booster 26, and a solenoid switching valve 34 and a one way valve 35 are connected in parallel to the conduit 33.

The conduit 33 communicates with the branch conduit 28a at a junction point P and branches into brake conduits 23RR, 23RL for the rear wheels 21RR, 21RL. A solenoid switching valve 37A is connected to the conduit 23RR and a solenoid switching valve 36A is connected to the conduit 23RL. The brake conduits 23RR, 23RL are provided with relief conduits 38R, 38L which are branched on the down stream portion of the solenoid switching valves 37A, 36A and communicate to the reservoir 31 respectively. The relief conduits 38R, 38L are provided with solenoid switching valves 37B, 36B.

The above-mentioned valves 32, 34, 36A, 37A, 36B and 37B are controlled by the traction control unit UTR. Namely, when the brake control operation for the slip control is not carried out, as shown in FIG. 1, the valve 32 is closed and the valve 34 is opened, and further the valves 36A, 37A are opened and the valves 36B, 37B are closed. Therfore, when the brake pedal 25 is operated, the brake fluid pressure is supplied to the brakes 21FR, 21FL for the front wheels 1FR, 1FL through the master cylinder 27 and is supplied to the brakes 21RR, 21RL for the rear wheels 1RR, 1RL through the conduit 33 of the booster 26.

When the brake control operation for the slip control explained below is carried out, the valve 34 is closed and the valve 32 is opened. A duty control on the valves 36A, 36B, 37A and 37B are carried out so as to maintain, increase or decrease the brake fluid pressure. Under the condition of the valve 32 being closed, the brake fluid pressure is maintained by the valves 36A, 36B, 37A and 37B being closed, and is increased by the valves 36A, 37A being opened and the valves 36B, 37B being closed, and is decreased by the valves 36A, 37A being closed and the valves 36B, 37B being closed. The one way valve 35 is provided so that the brake fluid pressure from the branch conduit 28a does not work as a reaction force to the brake pedal 25.

When the brake control operation for the slip control is carried out and then the brake pedal 25 is operated, the brake fluid pressure of the booster 26 corresponding to the braking force of the brake pedal 25 is supplied through the one way valve 35 to the brakes 21RR, 21RL for the rear wheels 1RR, 1RL.

Construction of the Engine Torque Adjustment Device

The control unit UTR for the traction control carries out not only the brake control operation by which the torque applied to the driving wheels or rear wheels 1RR, 1RL is decreased, but also the engine control operation by which the torque generated by the engine 2 is decreased. For the engine control, in an air intake passage 41 is disposed a main throttle valve 43 operatively connected to an accelerator pedal 42 and a subthrottle valve 45 operatively connected to an actuator 44 for adjusting the opening of the throttle. The subthrottle valve 45 is controlled by the control unit UTR through the actuator 44. In this case, because the main throttle 43 and the subthrottle valve 45 are disposed in series, the opening of the entire throttle is determined by whichever throttle is open least.

Construction of the Control Unit for the Traction Control

The control unit UTR for the traction control in the slip control operation carries out the brake control and the engine control in which the actuator 44 for adjusting the opening of the throttle is controlled.

The signals of the wheel speed sensors 64, 65, 66 and 67 which detect the speeds of each of the wheels are inputted to the control unit UTR. In addition, various other signals are inputted, such as that of the main throttle opening sensor 61, that of the subthrottle opening sensor 62, that of the vehicle speed sensor 63, that of the acceleration opening sensor 68, that of the steering angle sensor 69, and that of the manual selection switch 70.

The control unit UTR is provided with an input interface for receiving the signals from each of the above sensors, a microcomputer having a CPU, a ROM and a RAM, an output interface, and a drive circuit for driving valves 32, 34, 36A, 37A, 36B, 37B and the actuator 44. Programs necessary for the traction control and various maps are stored in the ROM. Various memories necessary for carrying out the traction control are provided in the RAM.

Contents of the Traction Control

Figure 3:
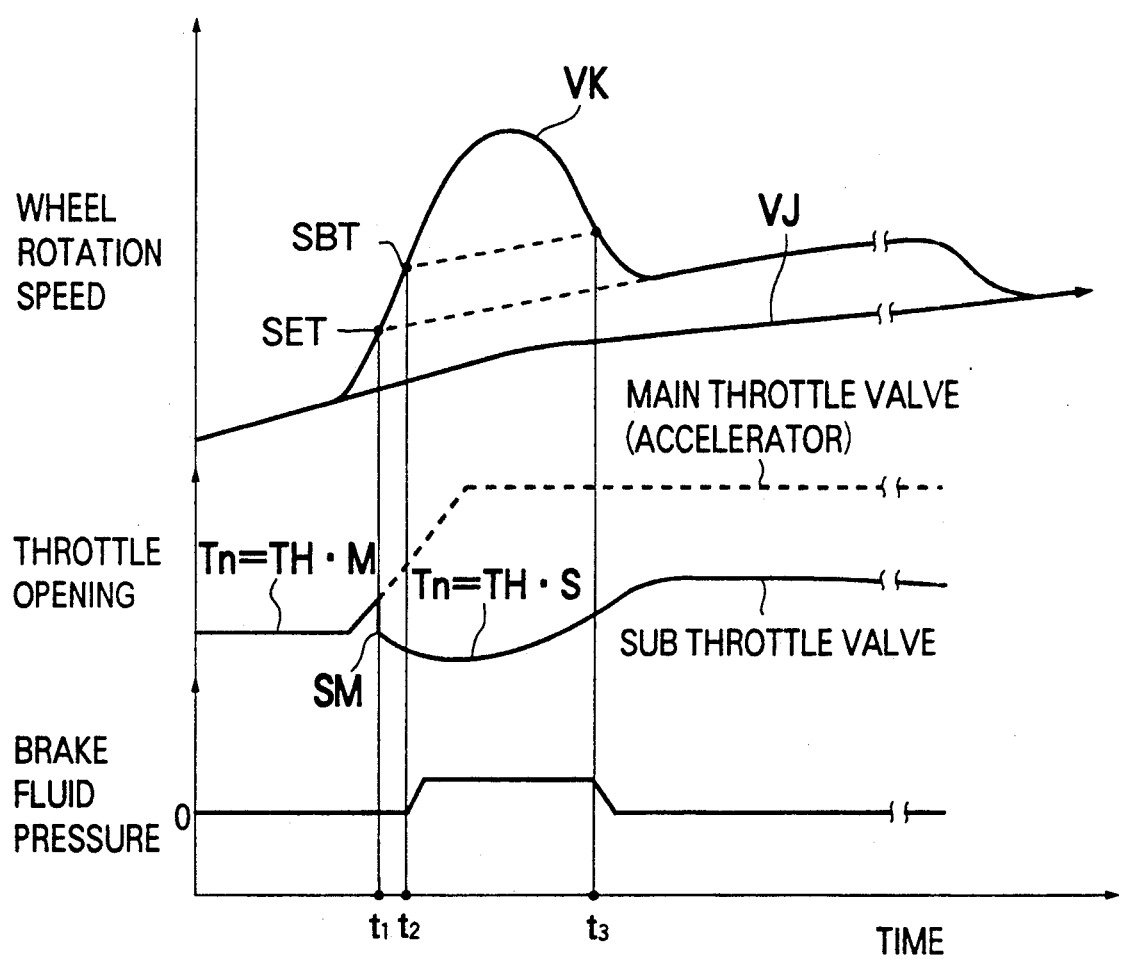
FIG. 3 is a time chart showing an outline of the traction control.

FIG. 3 is a time chart which shows the contents of the traction control by the control unit UTR.

In FIG. 3, SET shows a desired slip value in the driving wheels for the engine control, and SBT shows a desired slip value in the driving wheels for the brake control. SBT is provided greater than SET.

Figure 4:
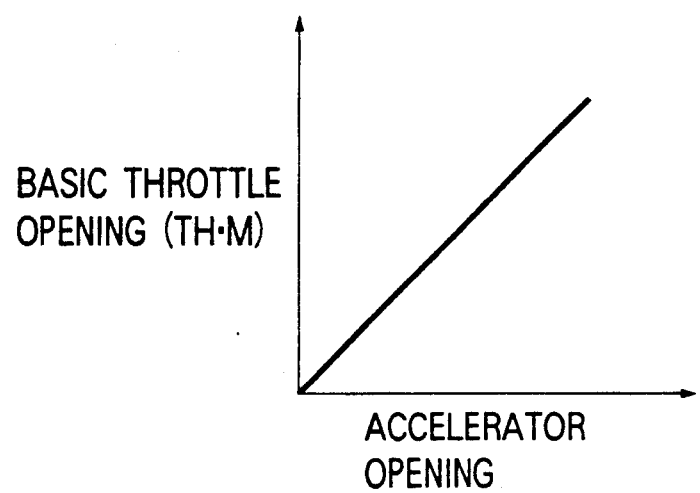
FIG. 4 is a diagram showing a relationship between a basic throttle opening and an accelerator opening.

Before the time $t_1$, the slip of the driving wheel is so small that the engine control is not operated. At this time, the subthrottle valve 45 is fully opened and the throttle opening Tn, which is a composite opening of the main throttle valve 43 and the substitute valve 45 and is determined by whichever throttle is open least, is controlled under the main throttle opening TH·M. The main throttle opening TH·M is determined by the acceleration opening which is an opening of the the acceleration pedal 25 as shown in FIG. 4.

At the time $t_1$, when the slip value of the driving wheel increases to the desired slip value SET for the engine control, the engine control operation for slip control is started. In the engine control operation, the actuator 44 controls the subthrottle valve 45 so that the throttle opening Tn is dropped to a lower limit control value SM.

After the throttle opening Tn is dropped to a lower limit control value SM, the opening TH·S of the subthrottle valve 45 is controlled by a feedback control so that the slip value of the driving wheel becomes the desired slip value SET for the engine control. When the engine control is started, the opening TH·S of the subthrottle valve 45 becomes smaller than the main throttle opening TH·M of the main throttle valve 43 and therefore the the throttle opening Tn is equal to the opening TH·S of the subthrottle valve 45.

When the slip value is not decreased enough by the engine control only, the slip value continues to increase and becomes greater than the desired slip value SBT for the brake control.

At the time $t_2$, when the slip value of the driving wheel becomes greater than the desired slip value SBT for the brake control, the brake fluid pressure is supplied to the brakes 21RR, 21RL of the driving wheels and the slip control employing both engine control and brake control are started. The brake fluid pressure is controlled by a feedback control so that the slip value becomes equal to the desired slip value SBT for the brake control.

At the time $t_3$, when the slip value of the driving wheel becomes less than the desired slip value SBT for the brake control, the brake fluid pressure is reduced to zero and the brake control is finished. Meanwhile, the engine control is still being carried out until there is no possibility that the slip value increases or the acceleration opening is reduced to zero.

Details of the Traction Control

Details of the traction control by the control unit UTR for the traction control will be explained with reference to the flow charts. P and R in the flow charts express a step respectively.

Figure 5:
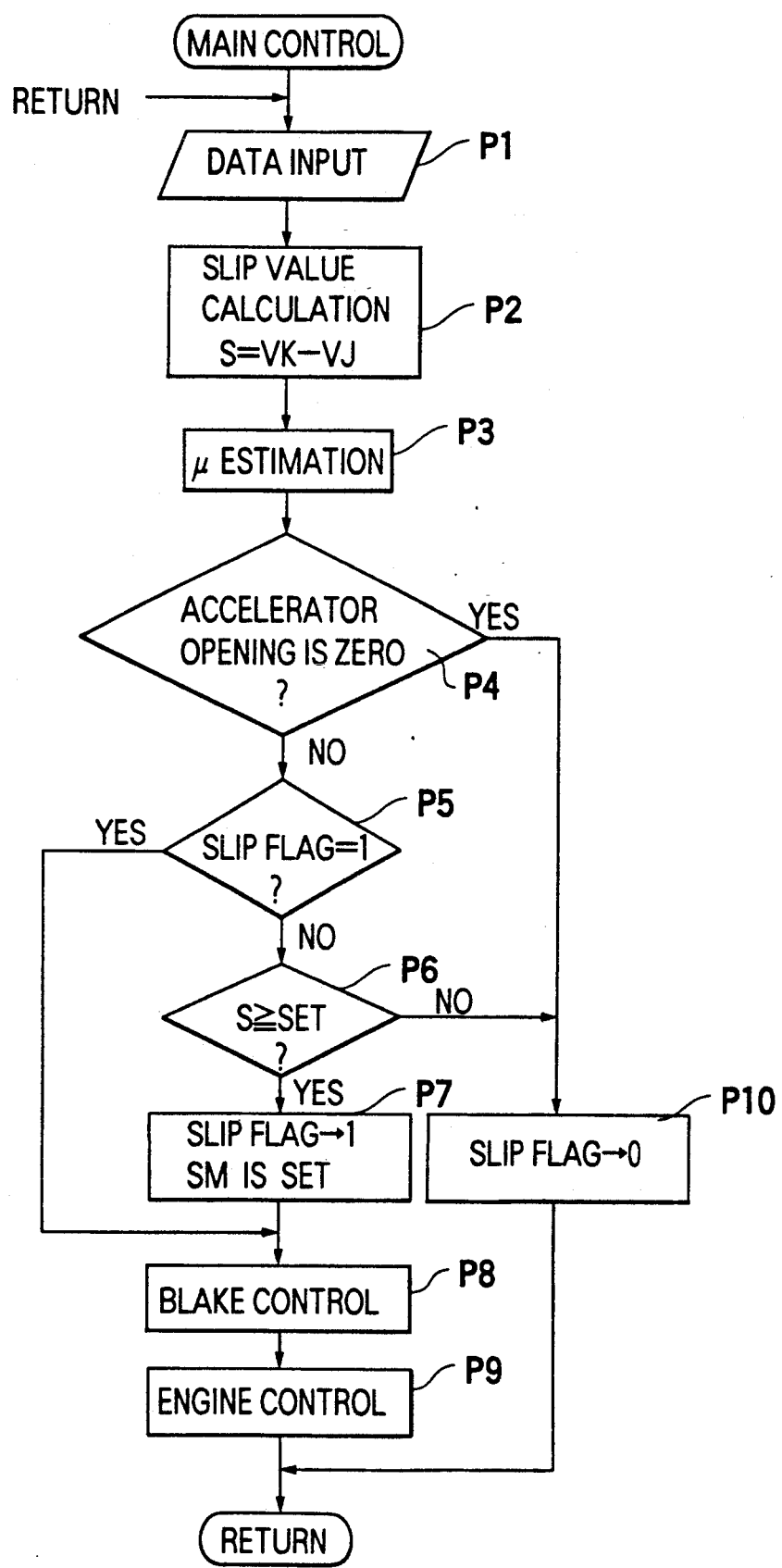
FIG. 5 is a flow chart showing a main control of the traction control in accordance with the present invention.

① Main Control (FIG. 5)

Referring to FIG. 5, in P1, various data or signals from the sensors and the switch are inputted. Then, in P2, the actual slip value S of the driving wheel is calculated by subtracting the rotation speed VJ of the driven wheel from the rotation speed VK of the driving wheel. In the calculation of the slip value S for the engine control, for example, the average of the rotation speeds of the right and left driven wheels may be employed as VJ, and the greater one of the rotation speeds of the right and left driving wheels may be employed as VK. For the brake control, the same as that of the engine control may be employed as VJ, and the respective rotation speeds of the right and left driving wheels may be employed as VK when the respective brakes of the right and left driving wheels are controlled independently.

In P3, the friction coefficient $\mu$ of the road surface is estimated based on the acceleration and the like calculated by the rotation speed of the driven wheel. How to estimate the friction coefficient $\mu$ of the road surface will be explained in detail below.

In P4, it is determined whether or not the accelerator opening is zero. When the accelerator opening is not zero, it is determined whether or not a slip flag is 1 in P5. "SLIP FLAG=1" expresses that the traction control is being operated. When the slip flag is not 1 in P5, it is determined whether or not the slip value S of the driving wheel is greater than the desired slip value SET for the engine control in P6. When the answer is YES to P6, the slip flag is set as 1 and the lower limit control value SM explained below is set in P7. When the answer is YES to P5, the procedure proceeds directly to P8. In P8, the brake control is carried out as explained below in FIG. 6. After P8, in P9, the engine control is carried out as explained below in FIG. 7.

When the answer is YES to P4, the slip flag is reset as 0 and the traction control is finished in P10.

Figure 6:
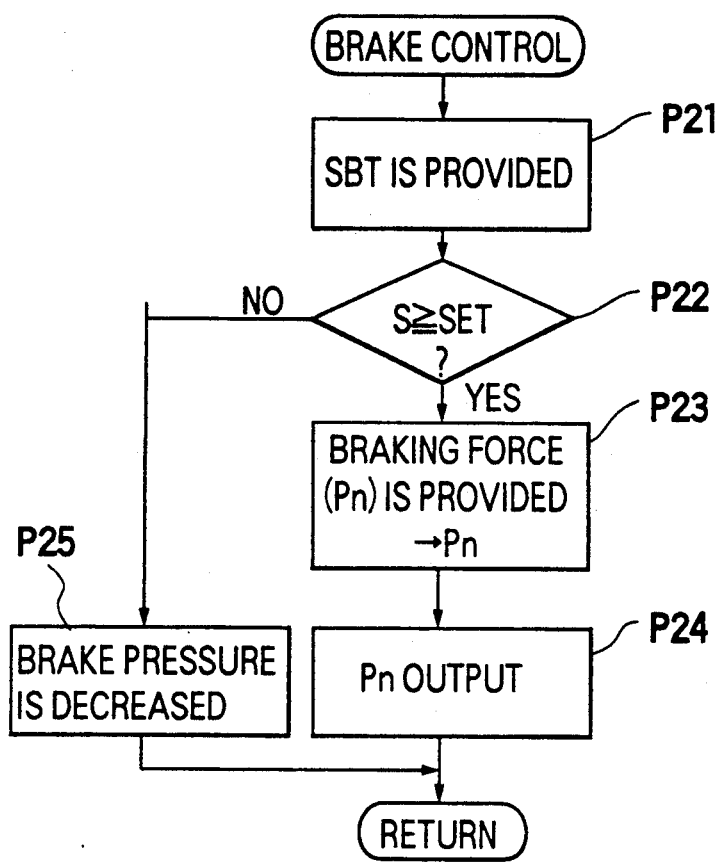
FIG. 6 is a flow chart showing a brake control of the traction control in accordance with the present invention.

② Brake Control (P8 in FIG. 5, FIG. 6)

Referring to FIG. 6, in P21, the desired slip value SBT for the brake control is provided as explained below. Then, it is determined whether or not the slip value S of the driving wheel is equal to or greater than SBT in P22. When the answer is YES to P22, the brake force Pn by which the slip value S decreases to SBT is provided in P23. The brake force Pn may be determined by controlling the duty ratio of the valves 36A, 36B, or the valves 37A, 37B under the I-PD control. Next, the signal corresponding to the the brake force Pn is outputted to the valve 32 in P24. When the answer is NO to P22, the brake fluid pressure is decreased gradually in P25.

Figure 7:
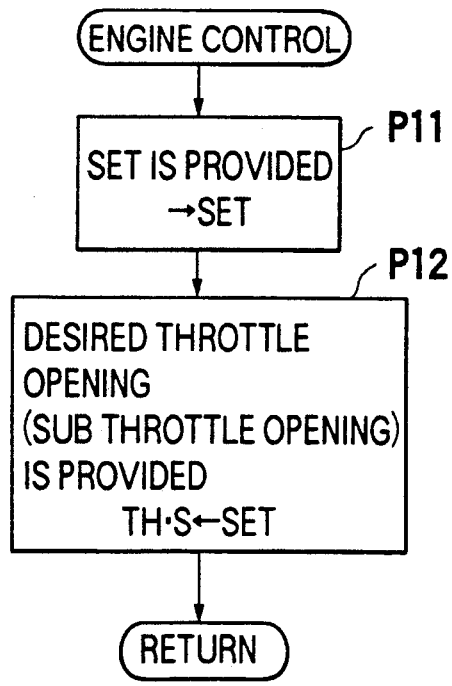
FIG. 7 is a flow chart showing an engine control of the traction control in accordance with the present invention.

③ Engine Control (P9 in FIG. 5, FIG. 7)

Referring to FIG. 7, in P11, the desired slip value SET for the engine control is provided as explained below. Then, the desired throttle opening TH·S (the opening of the subthrottle 45) corresponding to the desired slip value SET is determined by the PI-PD control in P12.

Figure 8:
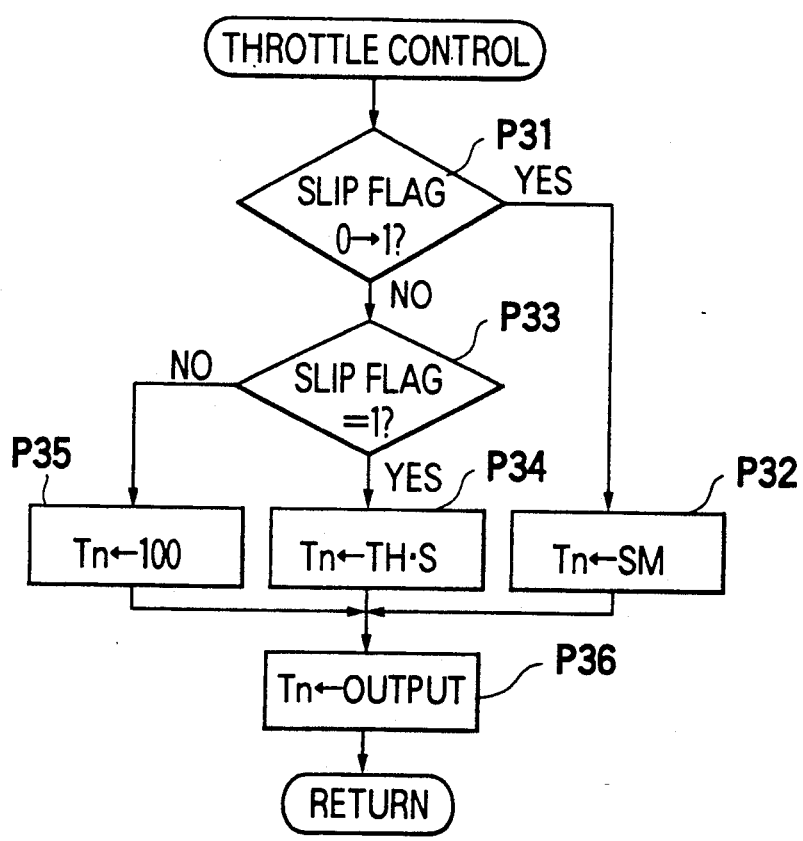
FIG. 8 is a flow chart showing a throttle control of the traction control in accordance with the present invention.

④ Throttle Control (FIG. 8)

FIG. 8 shows a flow chart for controlling the subthrottle valve 45 which is carried out by interrupting the flow chart of FIG. 5 in every predetermined time. It is determined whether or not it is the time the slip flag changes 0 to 1 or it is the time $t_1$ shown in FIG. 3 in P31. When the answer is YES to P31, in P32, the desired throttle opening Tn (the opening of the subthrottle 45) is set as the lower limit control value SM which is explained below.

When the answer is NO to P31, it is determined whether or not the slip flag is 1 in P33. When the answer is YES to P33, the desired throttle opening Tn is set as the opening TH·S of the subthrottle valve 45 in P34.

When the answer is NO to P33, the traction control is not being carried out. In this case, in P35, the desired throttle opening Tn is set as 100 in which Tn has a characteristics shown in FIG. 4.

After P32, P34 or P35 is carried out, the actuator 44 is driven so that the opening of the subthrottle 45 is equal to the desired throttle opening Tn in P36.

⑤ Desired Values SET, SBT and Lower Limit Control Value SM

Figure 9:
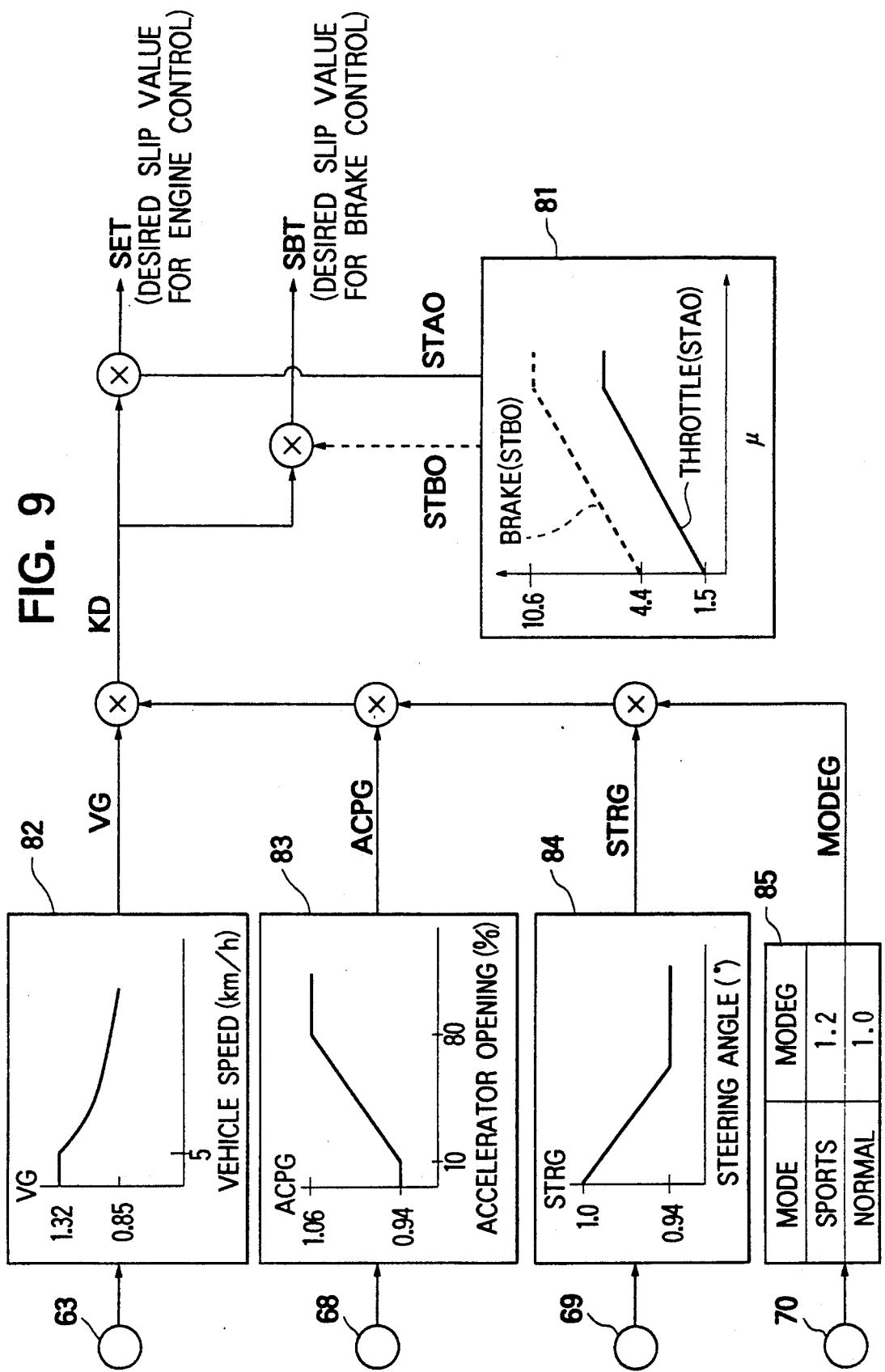
FIG. 9 is a block diagram showing a circuit for determining respective desired slip values for the brake control and the engine control.
Figure 10:
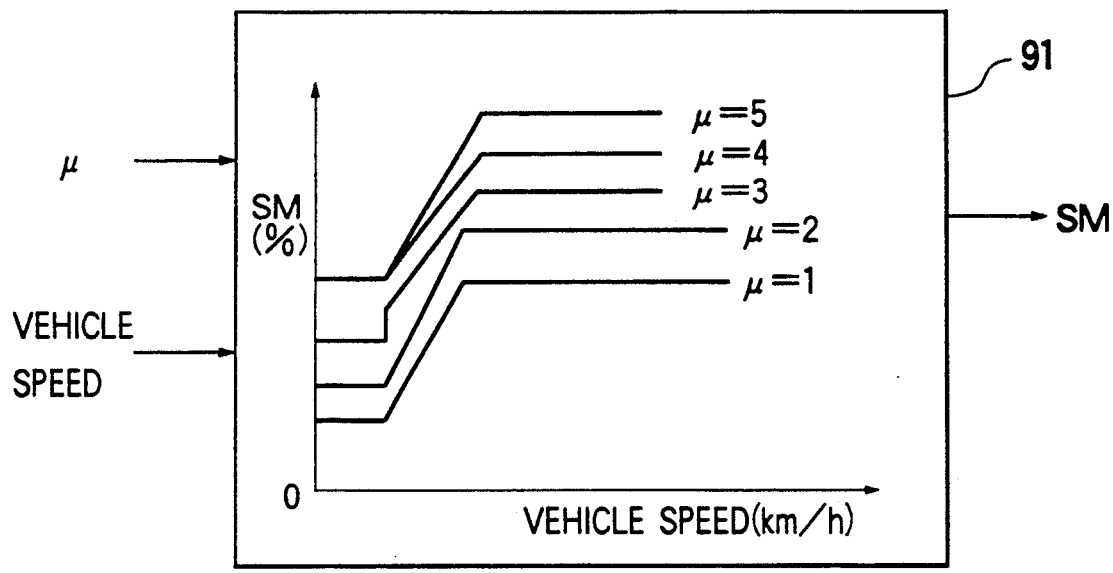
FIG. 10 is a diagram showing a map for determining a lower limit control value in the traction control.

Referring to FIG. 9 and FIG. 10, how to determine the desired values SET, SBT and lower limit control value SM is explained.

Referring to FIG. 9, SET and SBT are determined by parameters of the vehicle speed, the accelerator opening, the steering angle, the mode selected by the manual selection switch 70, and the friction coefficient $\mu$ of the road surface. A basic value STB0 of the desired slip value SBT and a basic value STA0 of the desired slip value SET are stored respectivly in a map 81 whose parameter is a friction coefficient $\mu$ of the road surface. In the map 80, the basic value STB0 is set at a larger value than the basic value STA0. The desired slip values SET and SBT are obtained respectively by multiplying the basic values STA0, STB0 by a correction gain KD.

The correction gain KD is obtained by multiplying a gain coefficient VG by gain coefficients ACPG, STRG, and MODEG. The gain coefficient VG is provided so as to obtain the stability of the vehicle in accordance with the increase of the vehicle speed and is given by a map 82 as a function of the vehicle speed. The gain coefficient ACPG is provided so as to obtain the driving force in accordance with the acceleration demand of the driver and is given by a map 83 as a function of the accelerator opening. The gain coefficient STRG is provided so as to obtain the stability of the vehicle in the steering operation and is given by a map 84 as a function of the steering angle. The gain coefficient MODEG is given by a table 85 and is manually selected from two modes, i.e. sports mode and normal mode by the driver.

Referring to FIG. 10, the lower limit control value SM of the throttle opening is stored as a map 91, whose parameters are vehicle speed and friction coefficient $\mu$ of the road surface. The friction coefficient $\mu$ varies from 1 to 5 where the smallest is equal to 1 and the largest is equal to 5. Those are as same as that of the map 81.

⑥ Estimation of the Friction Coefficient $\mu$ of the Road Surface

Figure 11:
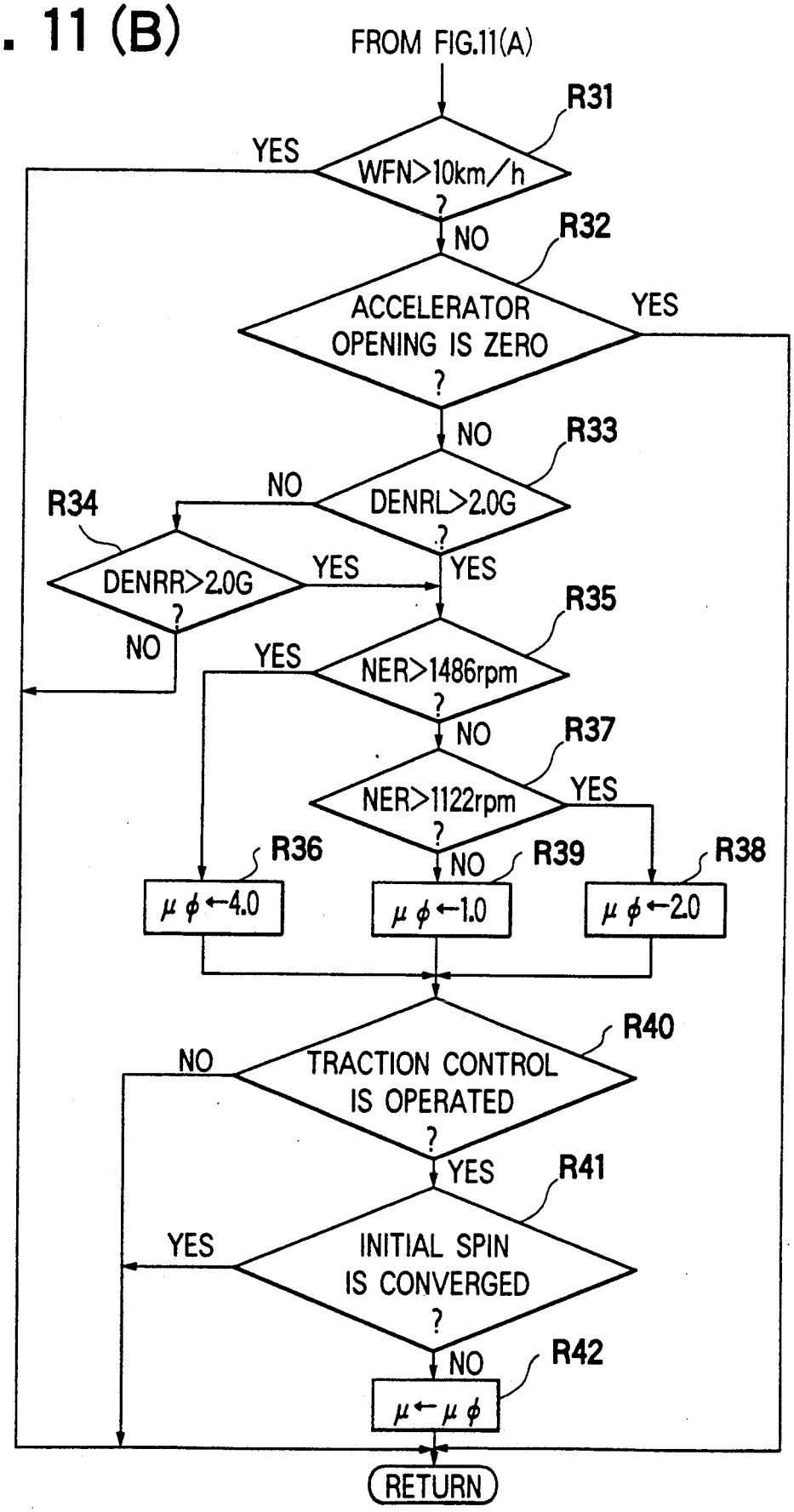
FIGS. 11(A) and 11(B) are flow charts showing a estimation of the friction coefficiect of the road surface.

FIGS. 11(A), 11(B) are flow charts which show the estimation of the friction coefficient $\mu$ of the road surface or the contents of P3 shown in FIG. 5. The entire procedure shown in FIGS. 11(A), 11(B) is carried out every 7 ms. The estimation of the friction coefficient $\mu$ varies depending on the running conditions of the vehicle. There are three such estimations, and these are explained respectively in R1~R11, R21~R26, and R31~R42.

Referring to FIGS. 11(A), 11(B), the contents of R1~R11 are explained. In R1~R11, a timer A and a timer B are employed. The timer A counts every 100 ms, and the timer B counts whether or not 500 ms has passed since the starting time.

It is determined whether or not the traction control is being operated in R1. When the traction control is being operated, it is determined by the timer B whether or not 500 ms has passed since the starting time in R2. When 500 ms has not passed, it is determined whether or not the timer A is equal to or greater than 100 ms in R3. When the answer is YES to R3, the acceleration G of the vehicle is calculated in R4. In an equation shown in R4, $Gk_1$ is a coefficient, WFN(K) is an average rotation speed of the right and left front or driven wheels, and WFN(K-100) is an average rotation speed of the right and left front wheels calculated 100 ms before the present time. Next, in R5, the friction coefficiect $\mu$ of the road surface is calculated by using the maps whose parameters are the acceleration G of the vehicle and the vehicle speed. Then, the timer A is reset in R6.

When the 500 ms has passed in R2, it is determined whether or not the timer A is equal to or greater than 100 ms in R7. When the answer is YES to R7, the acceleration G of the vehicle is calculated in R8. In an equation shown in R8, $Gk_2$ is a coefficient, WFN(K) is an average rotation speed of the right and left front or driven wheels, and WFN(K-500) is an average rotation speed of the right and left wheels calculated 500 ms before the present time. Next, in R9, the friction coefficiect $\mu$ of the road surface is calculated in the same manner as that in R5. Then, the timer A is reset in R10, and the timer B is set as 500 ms in R11. When the answer is NO to R3, the procedure proceeds directly to R31. When the answer is NO to R7, the procedure also proceeds directly to R31.

In R1~R11, before 500 ms (a first predetermined time period) has passed after the traction control is started, because the acceleration of the vehicle is not large enough, the acceleration is calculated by using the speed difference of the driven wheel during 100 ms (a second predetermined time period) every 100 ms, and the friction coefficiect $\mu$ of the road surface is estimated by the calculated acceleration. Further, after 500 ms has passed, because the acceleration of the vehicle is fully developed, the acceleration is calculated by using the speed difference of the driven wheel during 500 ms (a third predetermined time period) every 100 ms, and the friction coefficiect $\mu$ of the road surface is estimated by the calculated acceleration.

In other words, in R1~R11, before the acceleration of the vehicle is fully developed, the friction coefficiect $\mu$ of the road surface is estimated every 100 ms. After the acceleration of the vehicle is fully developed, the acceleration is calculated during 500 ms every 100 ms. Therefore, the value of the acceleration is averaged, and the influence of the noise and the like generated by the speed difference can be eliminated. As a result, an accurate friction coefficiect $\mu$ of the road surface can be estimated.

Figure 12:
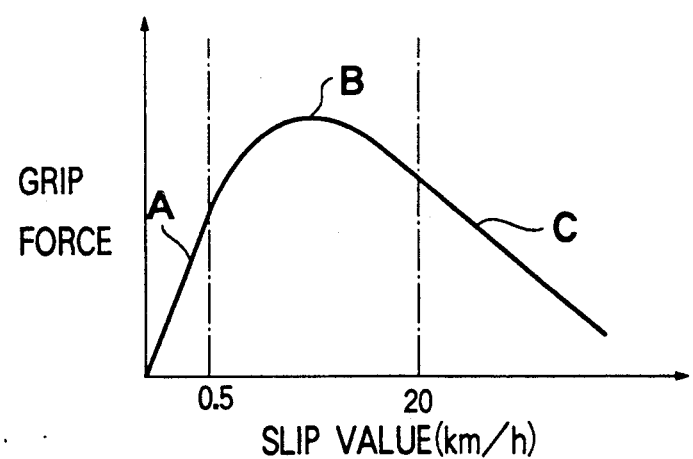
FIG. 12 is a diagram showing the relationship between the grip force of the driving wheels and the slip value.

Referring to FIGS. 11(A), 11(B), the contents of R21~R26 are explained. In R21~R26, WFN is an average rotation speed of the right and left front or driven wheels, and WRN is an average rotation speed of the right and left rear or driving wheels. FIG. 12 is a diagram showing the relationship between the grip force of the driving wheels and the slip value.

In R21, it is determined whether or not WRN is equal to or greater than WFN+20 km/h. When the answer is NO to R21, it is determined whether or not WRN is equal to or greater than WFN+0.5 km/h in R22, and when the answer is YES to R21, the procedure proceeds to R25. This case corresponds to that in which the slip value of the driving wheel is located in the region B in FIG. 12. Because the grip force of the driving wheel has an optimal value in the region B, the friction coefficiect $\mu$ of the road surface is updated with the value provided in R5 or R9.

When the answer is NO to R21 and R22, it is determined whether or not the present calculated $\mu$ (K) is equal to or greater than $\mu$ ](K-100) calculated 100 ms before the present time in R23. When the answer is YES to R23, the procedure proceeds to R25 in which the friction coefficiect $\mu$ of the road surface is updated; when the answer is NO to R23, the procedure proceeds to R24 in which the friction coefficiect $\mu$ of the road surface is not updated. This case corresponds to that in which the slip value of the driving wheel is located in the region A in FIG. 12. Because the slip value is small in the region A, the friction coefficiect $\mu$ of the road surface is updated only when $\mu$ (K) is equal to or greater than $\mu$ (K-100).

Further, when the answer is YES to R21, the procedure proceeds directly to R23, in which it is determined whether or not the present calculated $\mu$ (K) is equal to or greater than $\mu$ (K-100) calculated 100 ms before the present time. When the answer is YES to R23, the procedure proceeds to R25 in which the friction coefficiect $\mu$ of the road surface is updated; when the answer is NO to R23, the procedure proceeds to R24 in which the friction coefficiect $\mu$ of the road surface is not updated. This case corresponds to that in which the slip value of the driving wheel is located in the region C in FIG. 12.

Because the slip value is great in the region C, the friction coefficiect $\mu$ of the road surface is updated only when $\mu$ (K) is equal to or greater than $\mu$ (K-100).

In R21~R25, the friction coefficient $\mu$ of the road surface is updated by using the relationship between the grip force of the driving wheels and the slip value.

Therefore, an accurate friction coefficiect $\mu$ of the road surface can be estimated.

When the traction control is not being operated in R1, the procedure proceeds to R26 in which the timer A and the timer B are reset respectively, and the friction coefficiect $\mu$ of the road surface is set as 3.0. After this, the procedure proceeds to R25.

In R25, the value of the average rotation speed WFK of the right and left front wheels is updated with the value calculated 100 ms later. Namely, the values calculated respectively 500 ms, 400 ms, 300 ms, 200 ms, and 100 ms before the present time, are updated respectively with the values calculated 400 ms, 300 ms, 200 ms, and 100 ms before the present time and at the present time.

Referring to FIGS. 11(A), 11(B), the contents of R31~R42 are explained. It is determined whether or not WFN is greater than 10 km/h in R31, and it is determined whether or not the accelerator opening is zero in R32. When the answer is NO to R31 and R33, the procedure proceeds to R33. When at least either the left rear wheel acceleration DENRL or the right rear wheel acceleration DENRR is greater than 2.0 G in R33 and R34, the procedure proceeds to R35. It is determined whether or not the engine revolution speed NER is greater than 1486 rpm in R35. When the answer is YES to R35, the procedure proceeds to R36 in which step $\mu$ $\phi$ is set as 4.0. When the answer is NO to R35, the procedure proceeds to R37 in which step it is determined whether or not the engine revolution speed NER is greater than 1122 rpm. When the answer is YES to R37, the procedure proceeds to R38 in which step $\mu$ $\phi$ is set as 4.0. When the answer is NO to R37, the procedure proceeds to R39 in which step $\mu$ $\phi$ is set at 1.0. Next, it is determined whether or not the traction control is being operated in R40. When the traction control is being operated, it is determined whether or not the initial spin is converged in R41. When the initial spin is not converged, in R42, the friction coefficiect $\mu$ of the road surface is updated with the value $\mu$ $\phi$ which is set in R36, R38 or R39. The determination that the initial spin is converged is made when the rotation speed of the driving wheel is less than the predetermined threshold after passing the peak value of the slip.

When WFN is greater than 10 km/h in R31, and both the left rear wheel acceleration DENRL and the right rear wheel acceleration DENRR are equal to or less than 2.0 G in R33 and R34, the procedure does not proceed to R42 and therfore the friction coefficiect $\mu$ of the road surface is not updated. Further, when the accelerator opening is zero in R32, which means that the traction control is not being operated, the friction coefficiect $\mu$ of the road surface is not updated.

The conventional traction control system could not estimate the friction coefficiect $\mu$ of the road surface when the slip of the driving wheel occurs when the vehicle is started, because the acceleration G is not generated in the driven wheels. However, as shown in R31~R42, the embodiment of the present invention can estimate the friction coefficiect $\mu$ of the road surface based on the engine revolution speed NER (rpm) or the engine output condition when the the acceleration of the driving wheel is greater than the predetermined value.

In the embodiment of the invention mentioned above, the difference of the rotation speed between the driving wheel and the driven wheel is employed as the slip value. However, the present invention may employ a ratio of the rotation speed in the driving wheel and the driven wheel as slip value.

The present invention may carry out the slip control by using the engine control only or the brake control only.

What is claimed is:

1. A traction control system for a motor vehicle, having driving wheels and driven wheels, comprising:
   means for detecting a speed of each of the driving wheels of the vehicle;
   means for detecting a speed of each of the driven wheels of the vehicle;
   means for calculating a slip value of the driving wheels based on the speeds of the driving and driven wheels detected;
   traction control means for controlling the driving wheels so that the slip value of each driving wheel approaches a predetermined desired slip value when the slip value of each driving wheel is greater than the predetermined desired slip value; and
   estimating means for estimating a friction coefficient of a road surface which is employed when the predetermined desired slip value is determined;
   said estimating means (a) calculating an acceleration of at least one of the driven wheels based on a speed difference between the speed of the at least one of the driven wheels detected currently and the speed of the at least one of the driven wheels detected a second predetermined time period before a first predetermined time period has passed after the slip value of each driving wheel becomes greater than the predetermined desired slip value which is determined by employing a previously estimated friction coefficient of the road surface, (b) calculating an acceleration of the at least one of the driven wheel based on a speed difference between the speed of the at least one of the driven wheels detected currently and the speed of the at least one of the driven wheels detected a third predetermined time period after the first predetermined time period has passed, the third predetermined time period being greater than the second predetermined time period, and (c) estimating the friction coefficient of the road surface by using the calculated acceleration of the at least one of the driven wheels.

2. A traction control system according to claim 1, wherein said traction control means controls the driving wheels by controlling engine output and braking force.

3. A traction control system according to claim 2, wherein said predetermined desired slip value for controlling braking force is greater than that for controlling engine output.

4. A traction control system according to claim 1, wherein said traction control means controls the driving wheels by controlling engine output.

5. A traction control system according to claim 1, wherein said traction control means controls the driving wheels by controlling braking force.

6. A traction control system according to claim 1, wherein said slip value of the driving wheels is defined as a difference between the speeds of the driving and driven wheels.

7. A method for controlling traction for a motor vehicle, having driving wheels and driven wheels, comprising the steps of:
   detecting a speed of each of the driving wheels of the vehicle;
   detecting a speed of each of the driven wheels of the vehicle;
   calculating a slip value of the driving wheels based on the speeds of the driving and driven wheels detected;
   estimating a friction coefficient of a road surface by (a) calculating an acceleration of at least one of the driven wheels based on a speed difference between the speed of the at least one of the driven wheels detected currently and the speed of the at least one of the driven wheels detected a second predetermined time period before a first predetermined time period has passed after the slip value of each driving wheel becomes greater than the predetermined desired value which is determined by employing a previously estimated friction coefficient of the road surface, (b) calculating an acceleration of the at least one of the driven wheels based on a speed difference between the speed of the at least one of the driven wheels detected currently and the speed of the at least one of the driven wheels detected a third predetermined time period after the first predetermined time period has passed, the third predetermined time period begin greater than the second predetermined time period, and (c) estimating the friction coefficient of the road surface by using the calculated acceleration of the at least one of the wheels; and
   controlling the driving wheels so that the slip value of each driving wheel approaches a predetermined desired slip value, determined by said friction coefficient, when the slip value of each driving wheel is greater than the predetermined desired slip value.

* * * * *